April 26, 1938.  C. CHISHOLM  2,115,456
EMBOSSING MACHINE
Filed Nov. 13, 1935  6 Sheets-Sheet 1

FIG.1

INVENTOR.
BY Clifton Chisholm,
ATTORNEYS.

FIG. 2

April 26, 1938.  C. CHISHOLM  2,115,456
EMBOSSING MACHINE
Filed Nov. 13, 1935   6 Sheets-Sheet 3

Fig. 6

April 26, 1938.  C. CHISHOLM  2,115,456
EMBOSSING MACHINE
Filed Nov. 13, 1935   6 Sheets-Sheet 5

INVENTOR.
BY
ATTORNEYS.

Patented Apr. 26, 1938

2,115,456

UNITED STATES PATENT OFFICE 2,115,456

EMBOSSING MACHINE

Clifton Chisholm, Cleveland, Ohio, assignor, by mesne assignments, to Addressograph-Multigraph Corporation, Cleveland, Ohio, a corporation of Delaware Application November 13, 1935, Serial No. 49,504

34 Claims. (Cl. 197—6.6)

This invention relates to an embossing machine of the general type disclosed in Patents Nos. 1,518,904 and 1,831,103, issued to Addressograph Company, December 9th, 1924 and November 10th, 1931, respectively. In such machines a plate, which is to be embossed, is supported on a carriage and projected between cooperating plungers or dies which are usually slidably mounted in annular recesses in a revolving die head. A keyboard, similar to the ordinary typewriter keyboard, is employed to operate the machine and cause any one of a series of stops to become active to locate a selected pair of dies carried by the revolving die head in an embossing position relative to the plate retained by the carriage.

It has been found that in machines of the type mentioned, wherein the die head is successively stopped and restarted for each impression, the maximum diameter and weight allowable for the die head is quite definitely limited by the factors of inertia and centrifugal force developed. As each pair of aligned dies represents one embossing character, this has limited the number of characters, where high speed of operation is required. In the past, it has been found that for practical purposes the number of such dies was limited to those required for upper case characters with the essential numerals and punctuation marks. As upper case characters are essential for initials, there was no opportunity for lower case characters.

The primary object of the present invention is to provide for the embossing by both upper and lower case characters mounted in a revolving die head, in such manner that the diameter and weight of the head are not materially increased beyond that heretofore found satisfactory. Another object is to so arrange the controlling mechanism for the die head that the upper and lower case characters may be conveniently selected by a shift mechanism without increasing the number of character keys of the keyboard.

I accomplish the above objects by providing a keyboard embossing machine of the rotating die carrier type with two series of embossing die carrier type with two series of embossing units, each unit comprising a pair of coacting dies, the units of one series being alternately disposed about the periphery of the die carrier with respect to the units of the other series, and I further so arrange the keyboard mechanism that each key operates to stop the rotation of the die carrier with a selected unit or pair of dies of one series in an embossing position, a suitable shift mechanism being provided to partially rotate the die carrier to cause the same key to bring the next adjacent pair of dies which are in the other series, into embossing position.

The present invention will become more apparent from the following description, reference being had to the accompanying drawings, in which a preferred embodiment is illustrated. The essential features of the invention will be more fully set forth in the claims.

Figure 1:
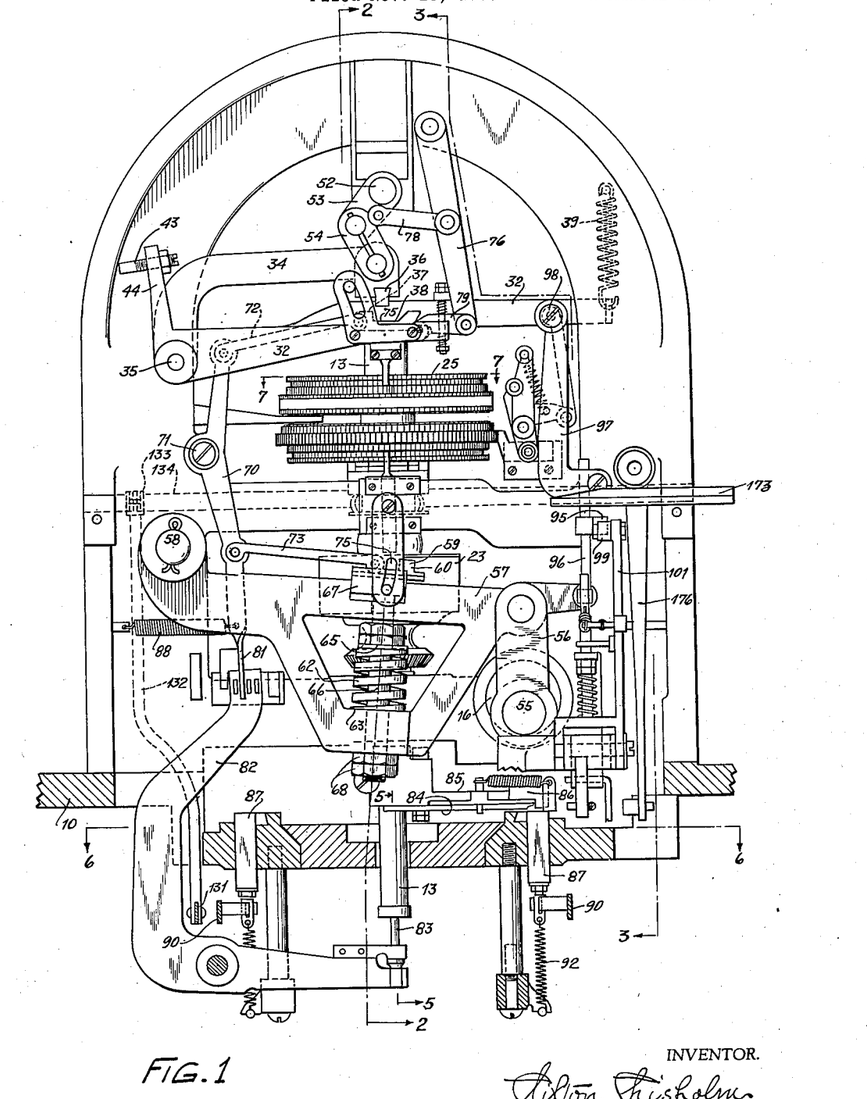
Fig. 1 is a front elevation of an embossing machine embodying my invention, certain parts being omitted and other parts being shown in section, to better illustrate the invention.
Figure 2:
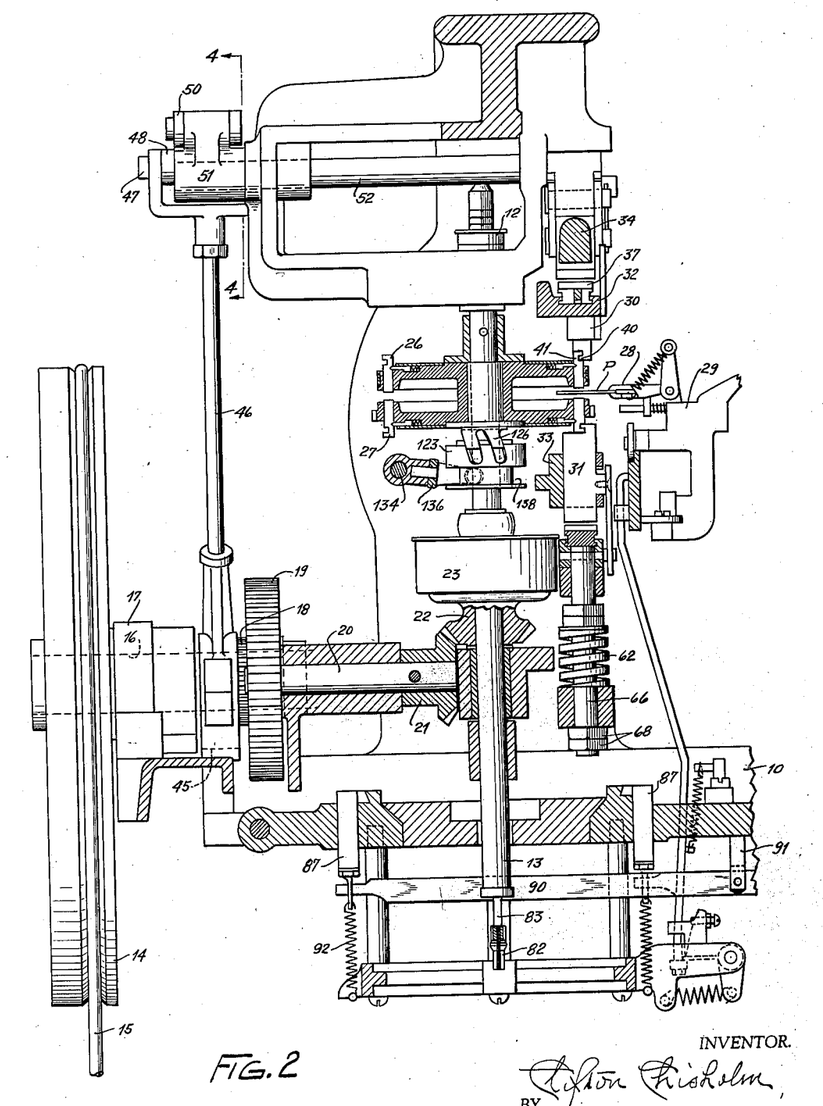
Figs. 2 and 3 are vertical sections, as indicated by the corresponding offset lines 2—2 and 3—3 on Fig. 1.

I will first describe in detail the general characteristics of the embossing mechanism shown, without regard to the double case feature of this invention, after which I will explain in detail the mechanism whereby I obtain the double case embossing. In Figs. 1 and 2, the frame of the embossing mechanism, designated 10, has suitable bearings 11 and 12 in which is mounted a vertical rotatable shaft 13 which carries the die head 25 so that the die head may be turned by the rotation of the shaft. My shift mechanism hereinafter described may shift the die head circumferentially relative to the shaft, but for the present it is only necessary to consider that the die head is rotated by the shaft.

Normally, the shaft 13 is constantly rotated by any suitable means, such as, for instance, by a motor not shown, but which is drivingly connected with a pulley 14, by a driving belt 15. The pulley is secured to a horizontal shaft 16 carried in suitable bearings 17 in the frame 10. This shaft carries, on its inner end, a pinion 18 arranged to drivingly mesh with a gear 19, which is rigidly secured to a jack shaft 20, and which in turn carries a bevel pinion 21 arranged to mesh with a similar bevel pinion 22 carried by the shaft 13. The bevel pinion 22 drives the shaft 13 through a suitable friction clutch 23 carried by the shaft.

The shaft 13 carries the die head 25, the details of which will be hereinafter more fully described, but which contains vertically movable pairs of dies 26 and 27, adapted to cooperate to form an impression or embossure upon a plate P held in suitable jaws 28 of a carriage 29, supported by the frame 10. The specific construction of the carriage forms no part of the present invention and therefore need not be described in detail.

The dies are arranged to be moved vertically in the die heads by die plungers 30 and 31. These plungers are mounted in a die shuttle arm 32, and a frame member 33, respectively. The plungers are given their vertical movement by a mechanism, about to be described.

As illustrated in Fig. 1, the upper die 26 is depressed by its plunger 30, which is rigidly mounted on the shuttle arm 32. A rock lever 34 is pivoted to the machine frame as at 35, and is provided on its outer end with a hammer 36, arranged to strike a raised abutment 37 of the shuttle 38, which is interposed between the shuttle arm, which carries the plunger 30 and the hammer 36, by the operation of a key board, as will be hereinafter more fully described. The die 26, together with the shuttle arm, after having been depressed by the hammer, is raised by a spring 39, interposed between the shuttle arm 32 and the frame, as shown in Fig. 1. A suitable hook 40 carried by the plunger 30 engaging a groove 41 in the die causes the shuttle arm to return the die. The upward or return movement of the die is limited by an adjusting screw 43, carried by an arm 44, and arranged to engage the frame, as illustrated in Fig. 1.

Figures 3, 4, 5:
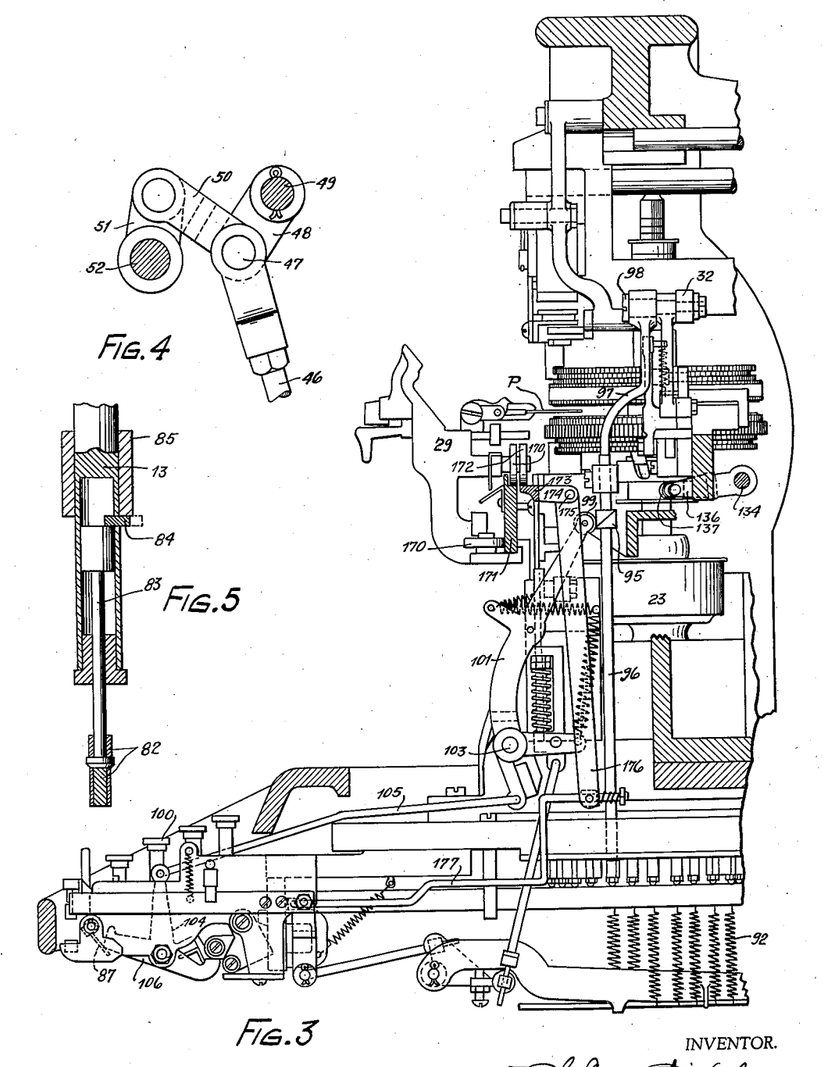
Figs. 4 and 5 are sectional details, as shown on the correspondingly numbered lines on Figs. 2 and 1, respectively.

The hammer lever 34 is rocked, to depress the upper die 26, by the drive shaft 16. As shown in Figs. 2 and 4, the drive shaft 16 is provided with an eccentric 45, on which is mounted a connecting rod 46, the upper end of which is pivotally connected as at 47 to a link 48, which, in turn, is pivoted to the frame 10, as at 49. Connected to the pivot 47 is a link 50, which in turn is pivotally connected to a crank 51 secured to a transversely extending shaft 52. This shaft is mounted in suitable bearings in the upper part of the frame member 10, and has, as shown in Fig. 1, a second crank 53, rigidly secured to its forward end. This latter crank is connected by a link 54, with the hammer arm 34, for operating the upper die.

The lower die is slidably mounted for vertical movement in a frame member 33 and is operated from the shaft 16 in timed relation to the operation of the upper die plunger 30. As shown in Fig. 1, the shaft is provided with an eccentric pin 55, which is connected by means of a link 56 with a lower shuttle arm 57, pivoted as at 58, to the frame 10 of the machine. Consequent upon the rotation of the shaft 16, the shuttle arm 57 is swung about its pivot 58, causing a shoulder 59 on a shuttle 60, carried by the arm, to engage the plunger 31, forcing a lower die toward an upper die.

To prevent damage to the parts, the arrangement is such that the movement of the shuttle arm 57 is imparted to the shuttle and the plunger 31 through the medium of a spring 62. As shown in Fig. 1, the spring 62 is interposed between a shoulder 63 of the shuttle arm and a shoulder 65 of a pin 66 carried by the shuttle bar 57. The upper end of this pin is secured to a shuttle carrier 67, which is mounted for vertical movement in suitable guideways of the shuttle arm 57. By adjusting the tension on the spring 62, any desired embossing pressure may be obtained.

The lower die 27 is returned by the shuttle arm 57. As illustrated in Fig. 1, the shuttle arm, on its downward stroke, engages an abutment 68 carried by the pin 66, thereby positively returning the shuttle carrier, the shuttle and the lower die.

From the preceding description it is obvious that the shuttle arms 32 and 57 are constantly actuated by the continuously operating shaft 16. However, they are effective to operate the dies only when the shuttles or distance blocks 38 and 60 have been moved to position their respective abutments 37 and 59 between their respective plungers and plunger operating mechanisms.

As illustrated in Fig. 1, the shuttles 38 and 60 are actuated to position their respective abutments by a bell crank 70, which is controlled by the actuation of the finger keys 100. As illustrated in Fig. 1, the bell crank 70 is pivoted to the frame 10, as at 71, and is provided with upper and lower extending arms which are pivotally connected by links 72 and 73, respectively, to the shuttles 38 and 60. Consequent upon a clockwise movement of the bell crank 70, under impulse of a spring 88 interposed between the bell crank 70 and the frame 10, the shuttles are moved so that abutments thereof will coact with their respective plungers to cause the dies to be actively operated. When, however, the parts are in position shown in Fig. 1, the actuation of the respective plunger operating mechanism is ineffective, due to recesses 75 in the shuttles.

The movement of the shuttles is controlled by the operation of the keys 100, in such a manner that, unless a key is depressed, the shuttles are retained in an inactive position. As shown in Fig. 1, the lower end 81 of the bell crank 70 is engaged by the upper end of one arm of a bell crank 82. The other arm of the bell crank is operatively connected to a rod 83, slidably mounted in the hollow lower end of the shaft 13. The actuation of the rod 83 is controlled by a latch 84, which is pivoted on an arm 85 secured to the shaft 13. This arm carries a striker 86 adapted to cooperate with any one of a number of key controlled stops 87, to stop the rotation of the shaft 13, it being obvious that the friction clutch 23 will permit this shaft to stop without injury to the mechanism. The operation of this latch mechanism is described in detail in Patent No. 1,518,904. Therefore, it is sufficient here to say that at the same time the striker arm 86 engages a stop 87, to stop the rotation of the shaft 13 and the die head 25, the latch 84 is withdrawn from a slot in the shaft 13, moving from its full line position shown in Fig. 5 to the dotted line position. This permits the spring 88 to rock the bell crank 70 clockwise to actively position the shuttles 38 and 60.

Mechanism is provided to return the shuttles to their inactive positions after the hammer 34 moves away from active engagement with its shuttle 38. As shown in Fig. 1, a lever 76 is pivoted to the frame 10 and is connected with the continuously operating crank 53 by a link 78. This lever carries a pawl 79 arranged to engage the shuttle 38 each time the hammer 34 moves upward. This returns such shuttle to its inactive position, and, through the links 72, and 73, and the bell crank 70, also returns the lower shuttle 60 to its inactive position. If, when the pawl 79 returns the shuttles, the stop 87 has been withdrawn from contact with the latch 84, due to the release of the keys 100, the latch will return to its full line position shown in Fig. 5, thereby retaining the shuttle inactive until another key has been depressed to actively operate its corresponding stop 87.

Figure 6:
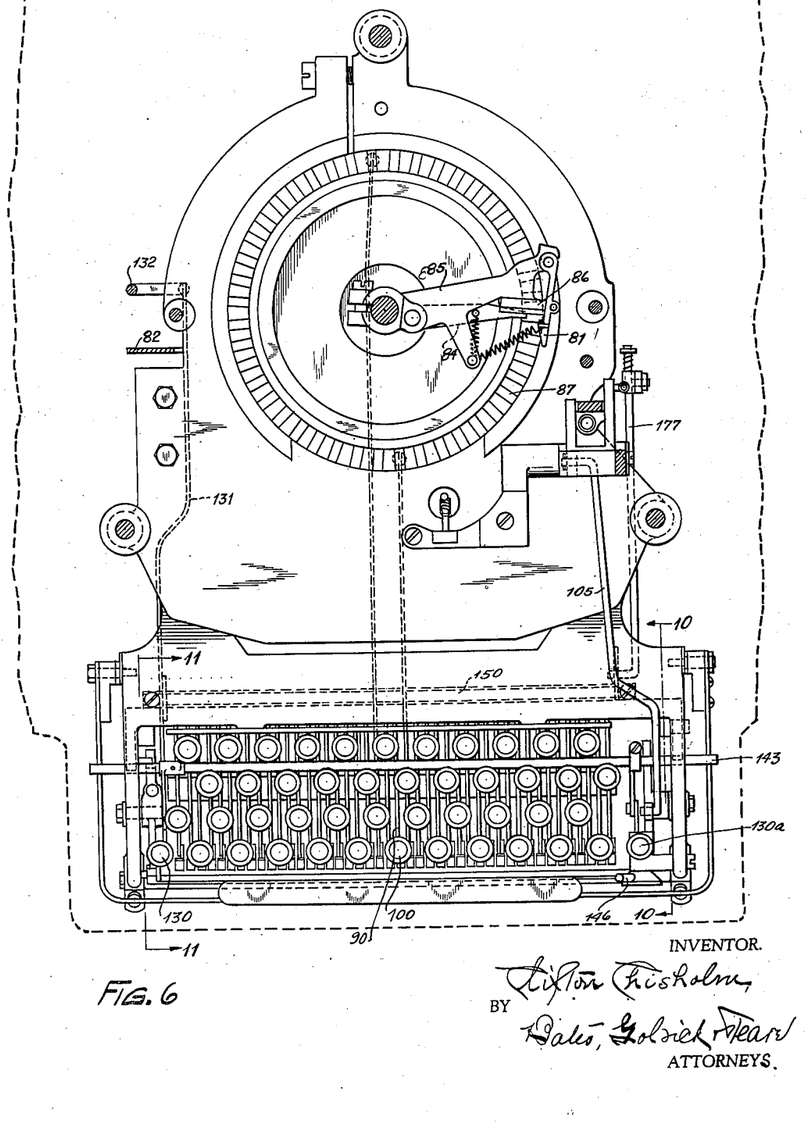
Fig. 6 is a horizontal section as indicated by the line 6—6 on Fig. 1.

The finger keys 100 operate the stops 87 to bring the die head to rest with a preselected pair of dies in the embossing position, as well as to release the latch 84 and render the shuttles active to cause the plate P to be embossed by such positioned dies. As shown in Fig. 6, I provide a series of stops 87 and these are arranged in a circle in the machine frame below and concentric with the die head 25. Each stop corresponds to a certain character represented by a key 100 and is operated by a key lever 90, to which respective keys 100 are secured. Each key lever 90 is pivotally mounted, as shown in Fig. 2, to a depending pin 91. Depression of a key raises its corresponding stop 87 against the action of a suitable spring 92. Release of the pressure on the key permits the spring to return the stop to its normal position.

Figures 10, 11, 12, 13, 14, 15, 16, 17, 18:
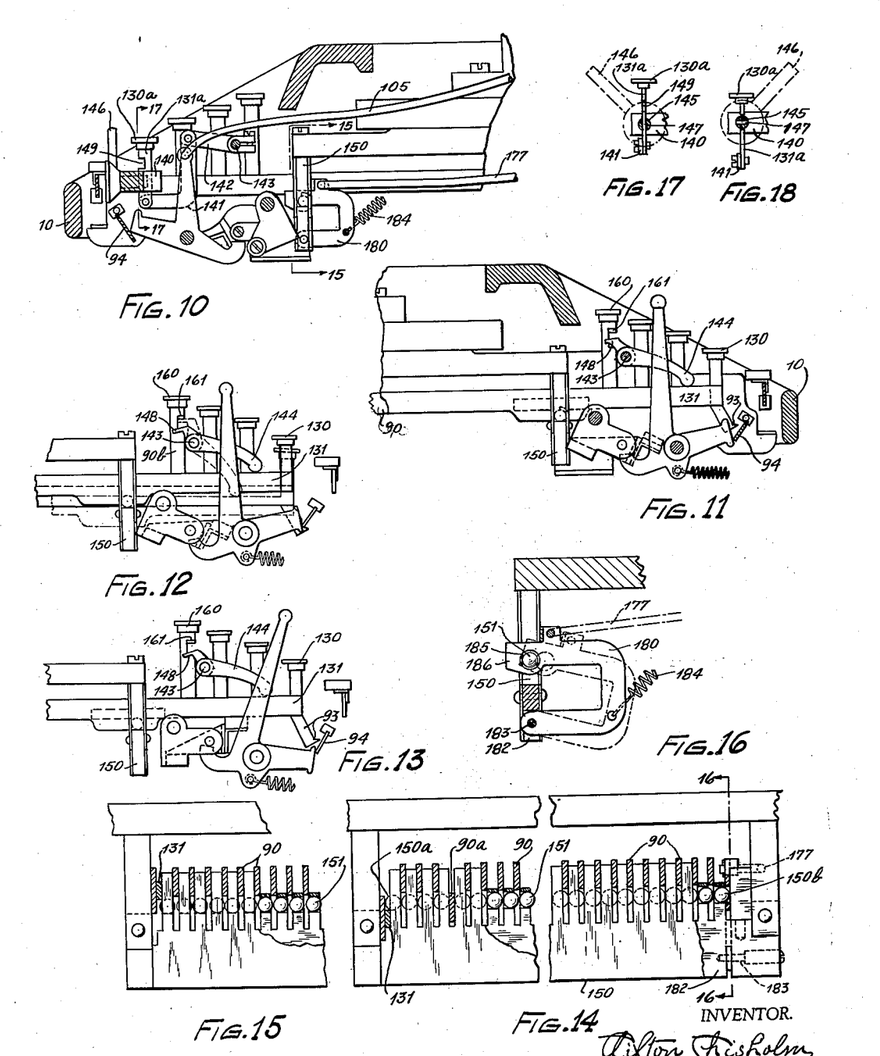
Figs. 10 and 11 are fragmentary vertical sections, as indicated by the correspondingly numbered lines on Fig. 6.
Figs. 12 and 13 are views similar to Fig. 11, but illustrating certain parts in a different position.
Figs. 14 and 15 are sectional details, the plane of the sections being indicated by the lines 15—15 on Fig. 10, Fig. 14 illustrating the parts in a slightly different position than Fig. 15.
Fig. 16 is an enlarged detail section, the plane of the section being indicated by the line 16—16 on Fig. 15.
Figs. 17 and 18 are details illustrating the shift key lock in different positions.

After a key 100 has been depressed, it is maintained in its depressed position until the embossing action has taken place. As shown in Figs. 11 to 13, inclusive, each key lever 90 has a downwardly projecting catch portion 93, which is normally in the position shown in Fig. 13. However, when a key lever is depressed, its respective catch is moved to a position beneath a gravity actuated latch 94 in the form of a pivoted plate extending transversely across the keyboard, and is thereby maintained in its depressed position until released by the action of the embossing mechanism.

After the embossing operation takes place, a cam 95 (Figs. 1 and 3) carried by a rod 96, and arranged to be actuated by a lever 97, which is connected as at 98 with the upper shuttle bar 32, is moved out of contact with a roller 99, carried by a lever 101. This permits a suitable spring 102 to rock the lever about its pivot 103 in a clockwise direction. The lower end of the lever 101 is connected with a bell crank 104 by a link 105, thereby causing a counter-clockwise movement of the bell crank, when the shuttle bar 32 is moved downwardly, during the completion of its embossing movement. The bell crank 104 is provided with an arm 106, which engages the latch plate 94, rocking it out of engagement with the engaged key lever 90, permitting its spring 94 to return such lever and its stop 87 to their normal or inactive positions. This mechanism is more fully illustrated and described in Patent No. 1,518,904, heretofore mentioned, and hence further description here is unnecessary.

Figure 7:
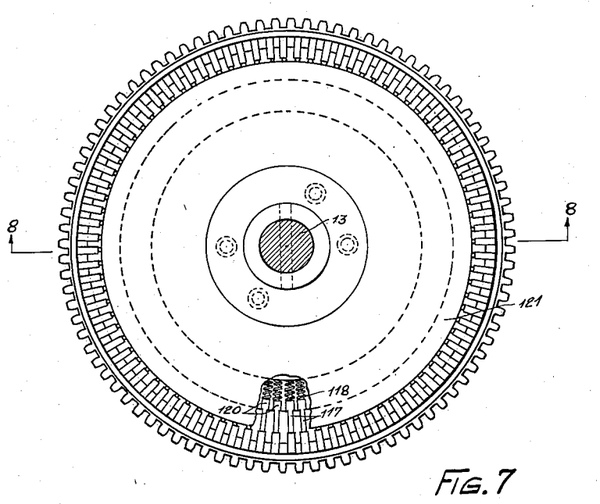
Fig. 7 is a plan view of the die head, being a horizontal section taken in the plane indicated by the lines 7—7 on Fig. 1, the scale of the section being somewhat larger to more clearly illustrate the parts.
Figures 8, 9:
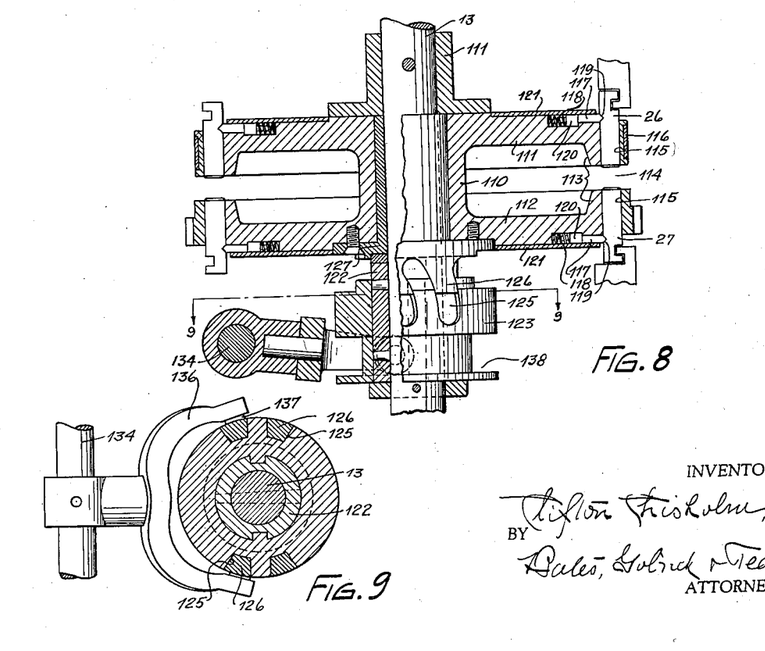
Fig. 8 is a transverse section through the die head as indicated by the lines 8—8 on Fig. 7.
Fig. 9 is a horizontal sectional detail, the plane of the section being indicated by the lines 9—9 on Fig. 8.

The die carrier and the operating mechanism with which the present invention is particularly concerned will now be described. The die head 25 is best shown in Figs. 7 and 8 and as there illustrated comprises a drum-like member having a hub 110, provided with upper and lower disc-like end members 111 and 112, each of which is provided adjacent its periphery with an enlarged annular flange 113, which flanges are spaced from each other, as shown in Fig. 8, forming annular recess 114 into which a plate P may be projected by the carriage 29. The flanges 113 of the die carrier are each provided with a series of axially extending slots 115, equally spaced about the periphery thereof, and arranged to slidingly receive the dies 26 and 27, respectively. The dies are restrained against outward movement in a radial direction by suitable annular bands 116 which form closure members for the slots and are secured to the periphery of the flanges 113 of the die carrier in any suitable manner.

The dies are normally retained in a retracted position by a series of plungers 117 which are slidably mounted in radially extending slots in the outer face of the respective end members 111 and 112. Suitable springs 118 disposed between the inner ends of the slots 117 and the plungers cause the latter to normally seat in V shaped notches 119 in the rear wall of the dies. An enlarged head portion 120 of each plunger serves to restrict the outward movement of the plungers and permit the removal of the dies without displacement of the plunger mechanism, thereby facilitating the changing or replacing of the dies. Suitable retaining plates 121 secured to the outer faces of the end members 111 and 112 retain the plunger assemblies against axial movement relative to the die carrier.

The die head is normally rotated in unison with the shaft 13. As shown in Figs. 8 and 9, a collar 122 is pinned to the shaft 13 below the die carrier, and has splined thereon a clutch member 123 which is provided with peripheral recesses 125, arranged to be engaged by projections 126 integral with a collar 127 to which the die head is secured, thereby normally driving the die head in unison with the shaft 13.

The arrangement of the dies on the die head is such that there are two pairs of dies for each stop 87. During normal action of the machine, which is used for the embossing of, say, lower case characters, the stops 87 function to stop the shaft 13 and consequently die head 25 in such a position that a selected die of alternate dies 26 is stopped in the embossing position to cooperate with the corresponding die 27. While this set of alternate dies may carry any embossing characters desired, I find that they preferably carry the lower case characters, the corresponding upper case characters being carried in the next adjacent dies, (i. e. in the other set of alternate dies). Hence, in the normal operation of the machine, the lower case characters will be embossed upon the plate, dependent upon which key 100 is depressed.

When it is desired to emboss an upper case character, a shift key 130 is first depressed, and then the key 100, which would be actuated for the corresponding lower case character, is depressed. The operation of the shift key serves to manually rotate the die carrier, counter-clockwise relative to its driving shaft 13, a distance equivalent to the center to center distance between adjacent dies. This, therefore, brings the dies into position so when the carrier is stopped an upper case embossing character die will be positioned in the embossing position, consequent upon the depression of the same key 100, as would be depressed to position the dies to emboss the corresponding lower case character.

The shift key 130 is provided with a lever 131 which is pivotally mounted on the frame 10 in a manner similar to the key levers 90, heretofore described. The lever 131, however, is pivotally connected at its rear end, as shown in Figs. 1 and 6, with a link 132 which in turn is connected to a rock arm 133 rigid with a rock shaft 134 journalled in the frame 10. The rock shaft 134 in turn is provided with an arm 135, which, as shown in Figs. 2 and 9, carries a yoke 136 provided with rollers 137. The rollers 137 seat in an annular recess 138 in the clutch member 123, and are arranged so that, consequent upon the depression of the shift key, the clutch member 123 will be moved axially upwardly.

The upward movement of the clutch member 123 consequent upon the depression of the shift key acts to rotate the die head 25 a distance equivalent to the center to center distance between the two dies 26. For this purpose, it will be noted in Figs. 2 and 8 that the slots 125 in the clutch member 123, which engage the projections 126 on the die head sleeve 127 are sloped relative to the axis of the shaft 13.

It is sometimes desirable to lock the shift key in depressed position and thereby set the die head for the embossing of upper case characters whenever a key 100 is depressed. For this purpose I provide a second shift key 130a which I position at the right-hand side of the keyboard. This key is slidably mounted in a block 140, which is secured to the machine frame 10. The depression of this key, through a bell crank 141 and a link 142, rocks a shaft 143 extending across the keyboard. The shaft 143 is provided, on its left-hand end, as shown in Fig. 13, with a pawl or arm 144, the lower end of which is arranged to contact with the lever 131 of the shift key 130, depressing such lever whenever the second shift key 130a is depressed.

The key 130a is locked in its lowermost position by the rotation of a pin 145, to which is secured a manually operable arm 146. The arrangement is such that when the pin 145 is in the position shown in Fig. 17, the shank 131a of the key 130a may reciprocate in a slot 147 in the pin. When, however, the key 130a has been depressed, and the operating handle 146 is swung from the position shown in Fig. 17 to the position shown in Fig. 18, the slot 147 is turned at right angles to the key shank and the end of the pin occupies a recess 149 in the key shank, thereby locking the key in its depressed position, consequently maintaining the die head in shifted position.

An arrangement is provided whereby two key levers 90 cannot be depressed simultaneously, or whereby a lever cannot be depressed while a previously depressed lever remains in its depressed position. As shown in Figs. 14 to 16, inclusive, this mechanism comprises a ball race 150, provided with a series of balls 151. The arrangement is such that when any one key lever 90 is depressed, the balls will be moved toward either end of their race. The distance between the ends of the race is such that it will accommodate only the series of balls and one key lever 90. Hence, after one key has been depressed the depression of any other key is prevented by contact with the various balls 151.

The ball race mechanism is so arranged that a key lever cannot be depressed during the movement of the shift lever, and to insure the proper depression of the shift lever further serves to lock the shift lever in place during the embossing cycle of operation. As shown in Fig. 15, the shift lever 131 is in its normal or uppermost position. It will there be noted that if a key lever 90 is depressed, the endmost ball 150 will move into contact with the end of the race and will prevent the depression of the shift key lever. The arrangement of the shift key lever is such that when it is depressed, it will assume the position illustrated in Fig. 14, where it will be noted that it is in a position entirely beneath the path of the balls 151, so that consequent upon the depression of a key lever, such as the lever 90a, the endmost ball 150 will prevent the upward movement of the shift key, until such time as the key lever 90a is released, due to the completion of the embossing cycle, as heretofore described.

I also provide an embossing mechanism with a blanking die, that is, a pair of dies which, when brought together will blank out a previously embossed character. The dies are similar in all respects to the other dies, except that they have no character formed thereon. This key lever is generally indicated in Figs. 11 to 13 at 160, and is connected by a key lever bar to its embossing dies or blanking dies in the same manner as heretofore described in connection with the keys 100. This key, however, operates the stop mechanism to cause its respective blanking dies to cooperate. The "blanking key" is so arranged that it may not be depressed when the shift key is depressed. For this purpose, I mount on the shaft 143 a stop pawl 148, which, when the shift key 130 is depressed, assumes the position shown in dotted lines in Fig. 12, where it will be observed that it is in contact with an abutment 161 and the upwardly extending portions of the key lever 90b to which the blank key 160 is secured, thereby preventing downward movement of the blanking key until such time as the shift key is released and the locking pawl 148 permitted to return to the normal position, shown in Fig. 13. This same arrangement may, of course, be utilized for any character key that does not have a corresponding alternate embossing die.

I have also so arranged the embossing mechanism that a key lever cannot be depressed unless a plate P is present between the dies. The plate-holding carriage, heretofore mentioned, is movable to position the plate relative to the die head. As shown in Fig. 3, the carriage is provided with rollers 170, which ride on a rail 171, secured to the machine frame. Unless the carriage 29 is in position to present a plate P to the action of the dies, a roller 172 carried by the carriage contacts with a horizontally extending bar 173, depressing such bar. The bar 173 is mounted on suitable arms 174 carried by a pivot shaft 175 journaled in the frame in any suitable manner. Rigidly connected to the shaft is a link 176, the lower end of which is connected by a rod 177, with a yoke shaped member 180, which is pivotally mounted in the ball race member 150, as at 182.

When the roller 172 is in contact with the rail 173 the member 180 is swung from the full line position illustrated in Fig. 16, to the dotted line position, against the action of a suitable spring 184. It will be noted from inspection of Figs. 14 and 16 that the member 180 is normally interposed in the ball race, being provided with an opening 185 through which the endmost ball 150 may pass. When, however, the carriage is not in position to present a plate to the die carrier, the outer end 186 of the member 180 is swung into the ball race, thereby preventing movement of any key lever until such time as the carriage is properly positioned.

It will be understood from the description given that by the novel provision of alternately arranged upper and lower case characters of the same circumferential row in the die head, together with shift mechanism enabling a repositioning of the die head with reference to the shaft by an amount corresponding to the distance from center to center of adjacent characters, I am enabled to produce double case embossing without materially increasing either the size of the die head or the number of character keys in the keyboard. The number of stop mechanisms of the machine is the same with my improvement as heretofore, and my shift requires comparatively few extra parts to those required for single case embossing. In fact, it is adapted to be embodied in existing single case machines. Experience in the operation of my machine shows that the same mechanical speed of operation as heretofore may be obtained, while the time required for actuation of the manual shift is very slight.

I claim:

1. In a machine of the character described, the combination of a continuously rotating die head, two sets of dies in a single circumferential row in said head, and selector means to stop the die head with a selected die of either set desired in the active position.

2. In a machine for making printing plates, the combination of a rotatable die head, upper and lower case dies in said head arranged in a single circumferential row, means to normally rotate the head, and means to shift the head relative to its rotating means while the head is rotating.

3. In a machine for making printing plates, the combination of a rotatable die head, means to normally rotate said die head continuously, means to move said die head about its axis independent of said first-named means.

4. In a machine for making printing plates, the combination of a die head rotatable in one direction only, a circumferential row of dies therein, power means to normally advance said die head by imparting a rotary movement to it, and selectively operable means to move said die head circumferentially by an amount corresponding to the distance from center to center of adjacent dies.

5. In a machine for making printing plates, the combination of a rotatable die head, dies in said head arranged in a circumferential row, means to normally rotate the head, and means to move the head in a circumferential direction relative to its rotating means while the head is rotating, said movement being by an amount corresponding to the distance from center to center of adjacent dies.

6. The combination of a rotatable die head, a circumferential row of dies in said head, having alternately arranged upper and lower case characters, means to rotate the head, a keyboard, means controlled thereby to stop the die head with a die of a character corresponding to the key actuated in the active position, and shift mechanism associated with the keyboard to determine whether the die in such position is upper or lower case.

7. In a machine for making printing plates, the combination with a continuously rotatable die head, of means to normally rotate said die head, dies carried by said die head to perform an embossing operation on a printing plate, said dies being arranged in two series, the dies of one series alternately disposed in said die head with relation to the dies of the other series, means to stop the die head with any selected die of one series in an embossing position, and means operable to cause said stop mechanism to become effective to position the dies of the other series in an embossing position.

8. In an embossing machine, the combination of a die head, means to normally move said die head, a plurality of dies carried in the same plane by said die head, a series of stops, means to selectively position said stops to stop the movement of the die head with any selected alternate die in the embossing position, and means actuatable independently of the position of the die head to change the relation of said die head to the stops to bring the next adjacent die into embossing position.

9. In an embossing machine, the combination of a rotatable die head, circumferential rows of male and female dies facing each other and carried by the die head with the individual dies parallel with the axis of rotation, each of said circumferential rows having alternately arranged upper and lower case characters, means to rotate the die head, and means to shift the die head circumferentially during rotation by an amount corresponding to the distance from center to center of adjacent dies in a row.

10. In an embossing machine, the combination of a rotatable die head, two circumferential rows of dies in said head, one row having male dies and the other row having female dies and each row having alternately arranged upper and lower case characters, power means to rotate the head continuously in one direction, means to stop the head to cause a pair of coacting dies to be in the embossing position, and means operable while the head is rotating to shift the head in a circumferential direction to determine whether the die to be stopped in embossing position shall be upper or lower case.

11. In an embossing machine, the combination of a rotatable die head, means including a friction driving element to normally rotate said die head continuously, a plurality of dies carried by said die head, a series of stops, keyboard means to selectively position said stops to stop the rotation of the die head with any selected alternate die in an embossing position and independent means associated with the keyboard to partially rotate said die head to bring the next adjacent die into embossing position.

12. In an embossing machine, a shaft, a die head mounted on said shaft, a plurality of dies mounted in said die head equidistant from each other, means to rotate said shaft and die head as a unit continuously, and means to partially rotate said die head relative to said shaft during such continuous rotation.

13. In an embossing machine, a shaft, a die head mounted on said shaft, a plurality of dies mounted in said die head equidistant from each other, means to rotate said shaft and die head as a unit, means to partially rotate said die head relative to said shaft, means to stop the rotation of said shaft, and means to cause the partial rotation to take place before the rotation of the shaft is stopped.

14. In an embossing machine, a frame, a die head rotatably mounted in said frame, a plurality of dies mounted in said die head and spaced equidistant from each other, power means to rotate said die head, means to partially rotate said die head a predetermined distance relative to said power means, means to stop the rotative movement of said die head due to the action of the power means, and means to cause the partial rotation to take place before said stopping means becomes effective.

15. In an embossing machine, a shaft, a die head mounted on said shaft, means to rotate said die head and shaft as a unit, two series of dies mounted adjacent the periphery of said die head, the dies of one series being alternately arranged relative to the dies of the other series, a series of stops equal in number to the number of dies in one series, selector means operative to render a predetermined stop active to stop the shaft and thereby bring a die of one series to rest in an embossing position, and mechanism to selectively rotate the die head independently of the position of the die head to cause the same stop to position the die head with a selected die of the other series.

16. In an embossing machine, a shaft, a die head mounted on said shaft, means to rotate said die head and shaft as a unit, two series of dies mounted adjacent the periphery of said die head, the dies of one series being alternately arranged relative to the dies of the other series in a single circumferential row, a series of stops, the number of which is equal to the number of dies in one series, key controlled mechanism to render any selected stop active to stop the shaft and thereby bring the corresponding die of one or the other series to rest in an embossing position, and key-controlled mechanism to selectively rotate the die head independent of said shaft to cause the active stop to position the die head with a die of a selected series in the embossing position.

17. In an embossing machine, a rotating die carrier, two series of embossing units carried by said die carrier, each unit comprising a pair of coacting dies, the units of one series being alternately disposed about the periphery of the die carrier with respect to the units of the other series, a keyboard mechanism, means whereby each key normally operates to stop the rotation of the die carrier with a selected unit of the first-named series in an embossing position, and a manually operable mechanism associated with the keyboard to position the die head so that said keys will operate to stop the rotation of the die head with a unit from the other series in an embossing position.

18. In an embossing machine, a shaft, a die head rotatably mounted on said shaft and restrained against axial movement relative thereto, means to rotate said shaft, a plurality of embossing dies carried by said die head and spaced equidistant from each other, means including a member shiftable axially of said shaft and having a driving connection therewith to transmit the rotary motion of the shaft to the die head and adapted to impart a rotary movement to the die head independent of the rotary movement of the shaft consequent upon axial movement of said member, and means to selectively move said member axially at the will of the operator.

19. In an embossing machine, a shaft, a die head rotatably mounted on said shaft, means to rotate said shaft, a plurality of embossing dies carried by said die head, means including a member shiftable axially along said shaft to impart a rotary movement to the die head independent of the normal rotary movement of the shaft, and means to move said member axially at the will of the operator.

20. In an embossing machine, a shaft, a die head mounted on said shaft, a plurality of dies mounted in said die head, means to rotate said shaft, a member to transmit movement from the shaft to the die head, said member being shiftable to partially rotate said die head relative to said shaft.

21. In an embossing machine, a shaft, a die head mounted on said shaft, a plurality of dies mounted in said die head, a shiftable collar on the shaft engaged to the die head to cause said shaft and die head to rotate as a unit, said collar having an inclined connection with the die head to partially rotate said die head relative to said shaft when the collar is moved lengthwise of the shaft.

22. In a machine for making printing plates, the combination of a rotatable die head, upper and lower case dies in said head arranged in a single circumferential row, mechanism to normally rotate the head, and means included in the rotating mechanism to shift the head relative to its rotating means.

23. In a machine for making printing plates, the combination of a rotatable die head, a circumferential row of dies therein, power means to normally advance said die head by imparting a rotary movement to it, and selectively operable means to move said die head circumferentially, including a movable member positively and constantly engaged to the die head.

24. The combination of a rotatable die head, a circumferential row of dies in said head, having alternately arranged upper and lower case characters, means to rotate the head, a keyboard, means controlled thereby to stop the die head with a die of a character corresponding to the key actuated in the active position, shift mechanism to determine whether the die in such position is upper or lower case, and two shift control means for the shift mechanism, one of said control means tending to release itself when pressure is removed and the other normally locking itself in set position.

25. In a machine of the character described, the combination of a rotatable die head, driving means to normally rotate said die head continuously in one direction, and a movable member included in the driving means to move said die head about its axis independent of said means.

26. A machine of the character described, having a die head continuously rotated in one direction by power mechanism, the die head carrying two sets of dies, and means for moving the die head circumferentially and independently of its normal rotary movement by an amount corresponding to the distance between the center lines of corresponding dies in the two sets.

27. The combination of a rotatable die head, a row of dies carried thereby, said row comprising both upper and lower case characters, means to normally rotate said head continuously in one direction, a movable cam included in the rotating mechanism operating to shift the die head angularly independent of its normal rotating means, whereby the head is set for either upper case or lower case characters, and means for stopping the die head with dies of selected character in operating position.

28. In an embossing machine, the combination of a rotatable die head, a row of male dies and a row of female dies carried thereby, each row comprising both upper and lower case characters, driving mechanism to normally rotate said head continuously in one direction, a movable cam included in the rotating mechanism operating to shift the die head angularly independent of normal rotation, whereby the head is set for either upper case or lower case characters, means for stopping said driving mechanism with dies of selected character in operating position, and means for causing such selected and positioned dies to approach each other to effect the embossing.

29. In an embossing machine, the combination of a shaft, a die head carried thereby, two circumferential rows of dies in the die head, one row having male dies and the other row having female dies, each row having alternately arranged upper and lower case characters, power means to rotate the shaft and thereby the head continuously in one direction, means operable while the head is rotating to change the angular position of the die head relative to the shaft to change from upper to lower case or vice versa, a keyboard and means operated thereby to stop the shaft in different selected positions to cause a pair of dies corresponding to the key actuated to be stopped in embossing position, and means to cause said selected and positioned dies to approach each other to effect the embossing.

30. In a machine for making printing plates, the combination of a die head rotatable in one direction only, a circumferential row of dies therein, power means to normally advance said die head by imparting a rotary movement to it, and selectively operable means to move said die head circumferentially by an amount corresponding to the distance from center to center of adjacent dies without stopping the rotation of the die head.

31. In a machine for making printing plates, the combination with a continuously rotatable die head, of means to normally rotate said die head, dies carried by said die head to perform an embossing operation on a printing plate, said dies being arranged in two series, the dies of one series alternately disposed in said die head with relation to the dies of the other series, means to stop the die head with any selected die of one series in an embossing position, and means operable independent of the rotation of the die head to cause said stop mechanism to become effective to position the dies of the other series in an embossing position.

32. In an embossing machine, a shaft, a die head mounted on said shaft, means to rotate said die head and shaft as a unit, two series of dies mounted adjacent the periphery of said die head, the dies of one series being alternately arranged relative to the dies of the other series and all of the dies being mounted in a single circumferential row, a series of stops, the number of which is equal to the number of dies in one series, key controlled mechanism to render any selected stop active to stop the shaft and thereby bring the corresponding die of one or the other series to rest in an embossing position, and key controlled mechanism to selectively rotate the die head independent of said shaft and while the die head is rotating to cause the active stop to position the die head with a die of a selected series in the embossing position.

33. In an embossing machine, a die head provided with two sets of dies in a single circumferential row, the dies of one set being disposed at a predetermined angular distance from the dies of the other set, mechanism connected with the die head for continuously rotating the die head, releasable means to change the relation of the die head to the rotating mechanism without stopping the rotation of the die head, whereby the dies of one set may be substituted for those in the other set, and be available on the subsequent stopping of the die head and rotating mechanism, and means acting automatically consequent upon the release of said releasable means to return the die head to its normal position relative to its rotating mechanism, whereby the available dies will be transposed to their normal positions.

34. In an embossing machine having a continuously rotating die head provided with dies belonging to a number of different classes or groups, all of said dies arranged in a single circumferential row, the dies of one group being dispersed a predetermined angular distance from the dies of the other group, a power-driving mechanism, a positive driving connection between the die head and said mechanism to rotate said die head, means to stop the die head with a predetermined die of one group in an embossing position, and a selector operable prior to the operation of said means and arranged and adapted to move the die head about its axis independent of the rotary movement imparted to the die head by the driving mechanism and cause a related die in another group to be stopped in the embossing position consequent upon the operation of said means, said selector being arranged and adapted to act without stopping the rotation of the die head or breaking said driving connection.

CLIFTON CHISHOLM.